(12) United States Patent
Monse et al.

(10) Patent No.: US 10,692,421 B2
(45) Date of Patent: Jun. 23, 2020

(54) ADDITIONAL MODULE FOR A PROCESSING AND/OR AUTOMATION FIELD DEVICE

(71) Applicant: Endress+Hauser GmbH+Co. KG, Maulburg (DE)

(72) Inventors: Benjamin Monse, Vogtsburg (DE); Kaj Uppenkamp, Wehr (DE); Wolfgang Brutschin, Schopfheim (DE); Izabella Sandor, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 393 days.

(21) Appl. No.: 15/534,161

(22) PCT Filed: Nov. 3, 2015

(86) PCT No.: PCT/EP2015/075540
§ 371 (c)(1),
(2) Date: Jun. 8, 2017

(87) PCT Pub. No.: WO2016/091480
PCT Pub. Date: Jun. 16, 2016

(65) Prior Publication Data
US 2018/0350294 A1    Dec. 6, 2018

(30) Foreign Application Priority Data
Dec. 11, 2014    (DE) .................. 10 2014 118 394

(51) Int. Cl.
*G09G 3/32* (2016.01)
*G01F 15/06* (2006.01)
(Continued)

(52) U.S. Cl.
CPC ............... *G09G 3/32* (2013.01); *G01D 13/00* (2013.01); *G01F 15/06* (2013.01); *G09G 3/2096* (2013.01);
(Continued)

(58) Field of Classification Search
CPC .... G09G 3/32; G09G 3/2096; G09G 2370/18; G09G 2370/16; G09G 2370/10; G01D 13/00; H04Q 9/00; G01F 15/06
See application file for complete search history.

(56) References Cited

U.S. PATENT DOCUMENTS

| 4,119,948 A | * | 10/1978 | Ward | G01D 4/006 340/870.02 |
|---|---|---|---|---|
| 5,902,938 A | | 5/1999 | Beaudoin et al. | |

(Continued)

FOREIGN PATENT DOCUMENTS

| DE | 4419190 A1 | 12/1995 |
|---|---|---|
| DE | 10326627 A1 | 1/2005 |

(Continued)

OTHER PUBLICATIONS

"Wireless Communication Using the IrDA Standard Protocol" by Bonnie C. Baker, Microchip Technology Inc. (Year: 2003).*
(Continued)

*Primary Examiner* — Xin Y Zhong
(74) *Attorney, Agent, or Firm* — Mark A. Logan; PatServe

(57) ABSTRACT

The present disclosure relates to an additional module for a processing and/or automation field device, at least including a module housing, an optical receiving unit which is arranged at least partly within the module housing, an electronic module unit, and a display/transmission unit. The optical receiving unit is designed to wirelessly receive at least one first optical signal from the field device and to
(Continued)

convert the at least one first optical signal into at least one first electric signal, and the electronic module unit is electrically connected to the receiving unit and to the display/transmission unit. The electronic module unit is designed to extract at least one piece of field device information from the at least one first electric signal and to transmit the at least one piece of field information to the display/transmission unit, and the display/transmission unit is designed to display the at least one piece of information and/or to transmit the at least one piece of information to at least one external unit.

14 Claims, 4 Drawing Sheets

(51) Int. Cl.
    *H04Q 9/00*     (2006.01)
    *G01D 13/00*     (2006.01)
    *G09G 3/20*     (2006.01)

(52) U.S. Cl.
    CPC ........... *H04Q 9/00* (2013.01); *G09G 2370/10* (2013.01); *G09G 2370/16* (2013.01); *G09G 2370/18* (2013.01)

(56) References Cited

U.S. PATENT DOCUMENTS

| | | | | |
|---|---|---|---|---|
| 6,014,076 | A * | 1/2000 | Luzzader | G01F 23/18 250/900 |
| 2004/0079152 | A1 * | 4/2004 | Sorenson | G01F 23/38 73/313 |
| 2005/0269532 | A1 * | 12/2005 | Ross, Jr. | G01F 23/36 250/573 |
| 2010/0148643 | A1 * | 6/2010 | Fauveau | G01F 23/00 312/223.1 |
| 2010/0257930 | A1 | 10/2010 | Isenmann et al. | |
| 2012/0038458 | A1 * | 2/2012 | Toepke | G05B 19/042 340/6.1 |

FOREIGN PATENT DOCUMENTS

| | | |
|---|---|---|
| DE | 10344575 A1 | 4/2005 |
| DE | 102008037194 A1 | 2/2010 |
| DE | 202011102482 U1 | 10/2011 |
| DE | 102010050192 A1 | 5/2012 |
| DE | 202013001191 U1 | 2/2013 |
| DE | 102013204535 A1 | 10/2013 |
| DE | 102012112160 A1 | 6/2014 |
| DE | 102013108532 A1 | 2/2015 |
| DE | 102006016381 A1 | 6/2015 |
| DE | 102013113438 A1 | 6/2015 |
| EP | 2306648 A1 | 4/2011 |
| EP | 2403301 A2 | 1/2012 |

OTHER PUBLICATIONS

Search Report for German Patent Application No. 10 2014 118 394.0, German Patent Office, dated Feb. 24, 2015, 11 pp.

Search Report for International Patent Application No. PCT/EP2015/075540, WIPO, dated Feb. 8, 2016, 13 pp.

* cited by examiner

ADDITIONAL MODULE FOR A PROCESSING AND/OR AUTOMATION FIELD DEVICE

CROSS-REFERENCE TO RELATED APPLICATION

The present application is related to and claims the priority benefit of German Patent Application No. 10 2014 118 394.0, filed on Dec. 11, 2014 and International Patent Application No. PCT/EP2015/075540, filed Nov. 3, 2015, the entire contents of which are incorporated herein by reference.

TECHNICAL FIELD

The present disclosure relates to an additional module for a processing and/or automation field device for displaying at least one piece of information about a switching state, and/or a parameter, and/or a piece of diagnostic information, and/or transmitting said information to an external unit.

BACKGROUND

In process and/or automation engineering, many different field devices are used to determine and/or monitor at least one process variable. These are, for example, fill-level measuring devices, flow meters, pressure and temperature measuring devices, pH-redox potential meters, conductivity meters, etc., which are used for recording the respective process variables, such as fill-level, flow, pressure, temperature, pH level, and conductivity. A field device typically includes at least one sensor unit that at least partially and at least temporarily comes into contact with the process, as well as an electronics unit which, for example, serves to detect, evaluate, and/or supply signals. In the context of the present application, all measuring devices are, in principle, termed field devices, which are used in proximity with the process, and supply or process process-relevant information, i.e., including remote I/O's, wireless adapters, and digital electronic components which are located on the field level.

Flow-measuring devices are, in particular, Coriolis, ultrasound, vortex, thermal, and/or magnetically-inductive flow-measuring devices.

Level-measuring devices are, in particular, microwave level-measuring devices, ultrasonic level-measuring devices, time-domain reflectometry-measuring devices (TDR), radiometric level-measuring devices, capacitive level-measuring devices, conductive level-measuring devices and/or temperature-sensitive level-measuring devices.

Pressure-measuring devices are, in particular, absolute, relative, or differential-pressure devices.

Temperature-measuring devices are, in particular, measuring devices with thermocouples and temperature-dependent resistors.

Limit level-measuring devices are, in particular, vibronic limit level-measuring devices, ultrasonic limit level-measuring devices, and/or capacitive or conductive limit level-measuring devices.

Analytical measuring devices are, in particular, pH sensors, conductivity sensors, oxygen and active oxygen sensors, (spectro)photometric sensors, and/or ion-selective electrodes.

To display information, operating states, measured values, device parameters, etc., field devices frequently have at least one display unit such as a display, or at least one visual and/or acoustic display element. An optical display element is a light-emitting element in particular, an LED. An acoustic element is, for example, a beeper.

The use of individual visual or acoustic display elements proves advantageous with regard to the required space, power consumption of the respective field device, and/or when the field device is used in a potentially explosive environment, such as is the case, for example, with encapsulated field devices that satisfy the IP69K standard. However, the bandwidth of display options is restricted to switching states, operating states, and/or the presence of faults or malfunctions.

DE102006016381A1 describes, for example, a field device with a display unit that comprises at least one LED. DE102008037194A1 describes a field device with a housing, within which a display device is arranged, that, for example, comprises at least one LED for displaying the function or a state of a wireless communications unit.

In addition to a fixed integration of such a display element in an existing field device, the use of subsequently attachable plugs is also known. For this, M12 plugs are frequently used in process and/or automation engineering. However, they are incapable of displaying faults or malfunctions of the field device locally (i.e., at the location of installation in the process). To expand the display options of corresponding display modules, the as yet unpublished German patent application with file number 102013108532.6 describes a plug with at least four display elements, wherein a first display element signals the readiness for operation of the field device, wherein a second and a third display element signal two antivalent switching outputs of the field device, wherein a fourth display element signals a fault or malfunction of the field device, wherein a circuit is provided which is designed such that a fault or malfunction of the field device is recognized using the antivalent switching outputs of the field device, and when a fault or malfunction is recognized, the fourth display element is activated.

Corresponding optical display elements are, for example, frequently also used for vibronic fill-level-measuring devices, such as are produced and marketed by the applicant under the designations LIQUIPHANT and SOLIPHANT, and by means of which a given fill-level is detected. Such field devices frequently also designated limit level switches are preferably used as dry-running protection for pumps, or as an overfill safeguard. The respective switching state is output by a switching output of the field device that is configured according to the type of use. In this context, this is also referred to as MIN-MAX safety. The on-site information concerning the respective switching output or switching state of the limit-level switch is generally very important for a customer, so that display elements with at least one light-emitting element are frequently integrated in the field device, which can at least visualize the respective switching state and/or the operating voltage.

The disadvantage of such display elements in the form of light-emitting elements is, however, that they are frequently difficult to see from a great distance or when the viewing angle is not perpendicular. Consequently, a display module is described in previously unpublished German patent application with file number 102013113438.6 that has a deflection body, such as a light guide, which deflects the light exiting at least one light-emitting element.

SUMMARY

Based upon the aforementioned prior art, the aim of the present disclosure is to expand the functionality of optical display elements in field devices.

This aim is achieved according to the present disclosure with an additional module for a processing and/or automation field device, the additional module including at least a module housing and an optical receiving unit at least partially arranged within the module housing, an electronics module unit, and a display/transmission unit, wherein the optical reception unit is designed to wirelessly receive at least one first optical signal from the field device and to convert the at least one first optical signal into at least one first electrical signal, wherein the electronics module unit is electrically connected to the receiving unit and the display/transmission unit, wherein the electronics module unit is designed to extract at least one piece of field device information from the at least one first electrical signal and transmit said signal to the display/transmission unit, and wherein the display/transmission unit is designed to display at least one piece of information and/or transmit said information to at least one external unit. A piece of field device information can, for example, be information about a switching state, and/or an operating state, and/or a parameter, and/or diagnostic information. The parameter can be a physical or chemical parameter of the medium, and/or the process environment such as pressure or temperature, as well as a sensor parameter. In the event of a vibronic sensor, this can, for example, be the mass, dimensions, or resonance frequency of a resonant unit. In the event of a capacitive fill-level-measuring device, this can, on the other hand, be, for example, the capacitance and/or the dimensions of the probe or additional electrode. In this context, the individual parameters and variables differ according to the field device used. The field device information to be transmitted may also be a measured value. A piece of diagnostic information provides insight into a fault and/or malfunction within the field device. In this case as well, the respective diagnostic information differs amongst the different types of field devices. However, the information from the at least one first optical signal and at least one first electrical signal is always information that is provided within the field device.

The additional module can be used for all field devices that display an optical signal, i.e., in particular, for field devices with at least one optical display element particularly, with a display element in the form of a light-emitting element such as an LED. Since many field devices already have display elements that emit light within the visual range of the visual spectrum, these field devices can be retrofitted easily and economically with an additional module according to the present disclosure. The receiving unit can be adapted to the display element in the field device and to the optical signal displayed by means of the display element in particular, with reference to its intensity and/or wavelength.

The use of an additional module according to the present disclosure therefore does not require any intervention in the electronic circuits and the arrangement of the respective components of the field device. Accordingly, an additional module can be correspondingly integrated without any repercussions. This is advantageous in field devices for use in environments critical to safety, such as, for example, in potentially explosive atmospheres, which must satisfy special safety requirements.

Correspondingly, the functionality of a field device can be expanded by using an additional module according to the present disclosure. The at least one first optical signal from the field device can contain either only the field device information already displayed by the respective device element as described above, or other field device information as well, in particular, such information as is not accessible by means of a simple optical display element. This information can then be displayed by the display/transmission unit. The field device can, however, also be redesigned without the electronics unit for example, to add an interface. In this case, the display/transmission unit is designed so that it can transmit information to an external unit. The external unit can, for example, be a device on the field level, or a central installation control unit.

The module housing may have a plug-in connection unit, by means of which the additional module is releasably mounted on or in the field device.

In an embodiment, the reception unit has a photodetector which is designed to receive the at least one first optical signal from the field device and convert said signal into at least one first electrical signal. The photodetector is adapted to the respective display element within the field device, or is designed to detect the first optical signal from the field device. Important factors to consider in this context are, for example, the luminous intensity of the LED, the transmission speed of the first optical signal which, inter alia, depends upon the chosen transmission method as well as the distance between the photodetector and the display element within the field device.

In another embodiment, the display/transmission unit has an LED, an RGB LED, or a display. In this case, the display/transmission unit serves the function of an additional display unit. Here, the display/transmission unit reproduces the information displayed by the display element within the field of device. In this case, the display/transmission unit can include an LED. If, however, the display function is to be expanded by the transmission of additional field device information that is not displayable by the optical display element, an RGB LED, for example, or also a display, is more suitable, since such display elements can differently depict a greater number of different pieces of device information.

Alternatively, the display/transmission unit can have a Bluetooth or wireless interface. In this case, the at least one piece of information can be transmitted to at least one external unit. A wireless interface can, for example, be a WLAN module. Accordingly, the functionality of an existing field device can be expanded with a new interface for transmitting information. No changes within the field device are required for this, since the transmission from the field device to the additional module is by means of the optical display element of the field device and an optical transmission. This is advantageous when the field device is used in a potentially explosive environment. The electronics in the field device that must satisfy strict safety requirements in this case do not have to be changed.

The display/transmission unit may also have both a display and a transmission interface.

The electronics module unit may include at least one arithmetic unit. The at least one first electrical signal that contains the at least one piece of information from the field device can thereby be evaluated and, processed accordingly, forwarded. Depending upon the method used for optically transmitting the at least one piece of field device information by means of the at least one first optical signal, the at least one arithmetic unit must be able to execute certain methods and protocols. For example the at least one arithmetic unit may be configured to execute a protocol in particular, an IrDA- or UART-encoded protocol in order to extract the at least one piece of information from the at least one first optical signal of the field device. This is suitable if the at least one piece of device information is modulated onto the at least one optical signal.

In an embodiment, the additional module is designed for bi-directional communication with the field device. However, in this case, the receiving unit is insufficient for receiving the at least one first optical signal within the additional module. In this case the additional module has an optical transmission unit for transmitting at least one second optical signal to the field device. The optical transmission unit of the additional module again needs to be adapted to the respective field device.

Different types of transmission can be selected for transmitting the at least one first and at least one second optical signals. If the additional module has to be designed only for displaying the at least one piece of information, merely forwarding the optical signal of the display element is sufficient. If additional information needs to be transmitted, a specific transmission method must be chosen, by means of which the at least one piece of field device information can be overlaid onto the at least one first and possibly the at least one second optical signal. Various options are conceivable for this.

The present disclosure is furthermore realized by a processing and/or automation field device including at least one sensor module and field device electronics with an optical display unit, and with an additional module according to the present disclosure, wherein the field device electronics are designed to apply at least one second electrical signal to the optical display unit, which at least one second electrical signal contains the at least one piece of field device information, wherein the optical display unit is designed to transmit a first optical signal containing the at least one piece of field device information, and wherein the additional module is arranged such that the receiving unit faces the optical display unit. In this instance, at issue is a field device equipped with an additional module, wherein the additional module is mounted in or on the field device. In the arrangement, care should be taken that the at least one first optical signal can arrive at the receiving unit unhindered. The optical display unit of the field device and the receiving unit of the additional module should therefore be arranged facing each other so that the receiving unit lies within the beam path of the at least one first optical signal. The optical display unit of the field device can, for example, be a display or an optical display element in particular, a light-emitting element, for example, an LED. The LED should be designed to display at least one switching state, operating state, and/or piece of information about a fault and/or a malfunction by means of at least one transmitted optical signal at a wavelength corresponding to the visible range of light. For example, different pieces of information can be displayed in different colors. The color green is frequently used to display the operating state, yellow to display switching states, and red to display a fault and/or malfunction.

In an embodiment, the at least one piece of field device information is transmitted by means of a modulation. The at least one piece of field device information is modulated onto the optical signal of the optical display element of the field device by means of the field device electronics. The electronics module unit is then, moreover, capable of extracting the at least one piece of information from the at least one corresponding first electrical signal, and then demodulating this signal. Of course, other optical transmission methods can also be used. For example, a method for non-visual data transmission by a field device with at least one display element is described in DE102012112160A1. The display element can be designed to visually portray at least one piece of field device information. For data transmission, preferably, the non-visual optical signal is simultaneously transmitted. For this, the field device would have to be equipped with a display element that is designed for non-visual data transmission, which tends to be rather rare.

In another embodiment, the additional module is releasably attached within the field device electronics and, in particular, mounted above the optical display element. The additional module is thus arranged within a housing of the field device electronics. It is arranged so that any existing safety requirement from protective regulations for use in a potentially explosive atmosphere is retained. Such an arrangement is then particularly compact.

In this embodiment the field device electronics includes a window, wherein the displayed transmission unit is arranged facing the window. This is necessary when the display/transmission unit has a display or an LED, in order to display the at least one piece of field device information by means of the display/transmission unit.

In an embodiment, the field device electronics has a field device housing which makes it possible to use the field device in a potentially explosive environment.

As mentioned, the optical display unit in an embodiment has at least one light-emitting optical display unit, e.g., an LED, for displaying at least one light signal, in particular, a colored signal. In this context, the optical display unit may display at least one switching state, an operating state, a fault, and a malfunction of the field device by means of the light signal in particular.

In another embodiment, the field device has a field device receiving unit, in particular, another photodetector for receiving the at least one second optical signal from the additional module. This measure is, for example, necessary in order to enable bi-directional communication between the field device and the additional module.

BRIEF DESCRIPTION OF THE DRAWINGS

The present disclosure, as well as a number of advantageous embodiments, will be further explained below with reference to FIG. 1 through FIG. 6. In the drawings.

DETAILED DESCRIPTION

Figure 1:
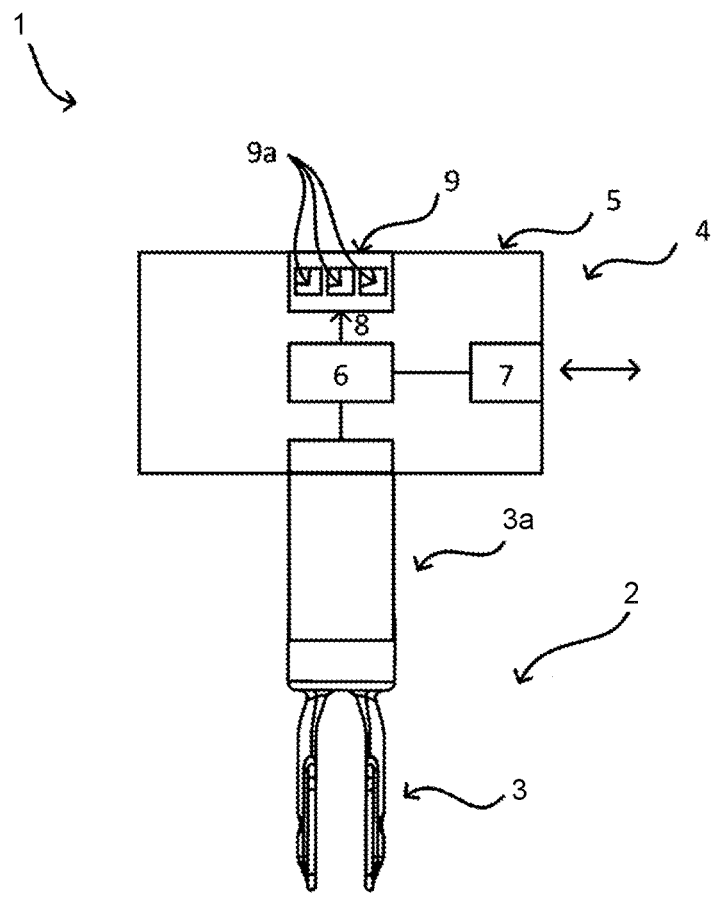
FIG. 1 shows a schematic diagram of a fill-level-measuring device including an optical display element.

FIG. 1 shows a schematic diagram of a field device 1. It is, for example, a vibronic fill-level-measuring device, or a limit level switch. The sensor unit 2 includes a mechanically resonant unit 3 in the form of a vibrating fork. The resonant unit in a generic field device can, however, also be a single rod or a membrane. The sensor unit 2 is electrically connected via a neck tube 3a to field device electronics 4 arranged in an encapsulated field device housing 5. A central control unit 6 is responsible for measured value processing and controlling the field device 1. By means of a second electrical signal 8, said unit also controls an optical display unit 9, within which three light-emitting optical display elements 9a are arranged in the form of LED's. Moreover, the field device electronics 4 in the example addressed here have an output unit 7 that, for example, can be used for parameterizing the field device 1. The output unit is, however, an optional component.

To use an additional module 10 according to the present disclosure, the respective field device 1 must be available through an optical display element 9, and the field device electronics 4 must be designed to control this optical display unit 9. For one embodiment of the present disclosure, they should, for example, be able to modulate at least one piece of field device information onto the optical display unit 9.

Figure 2:
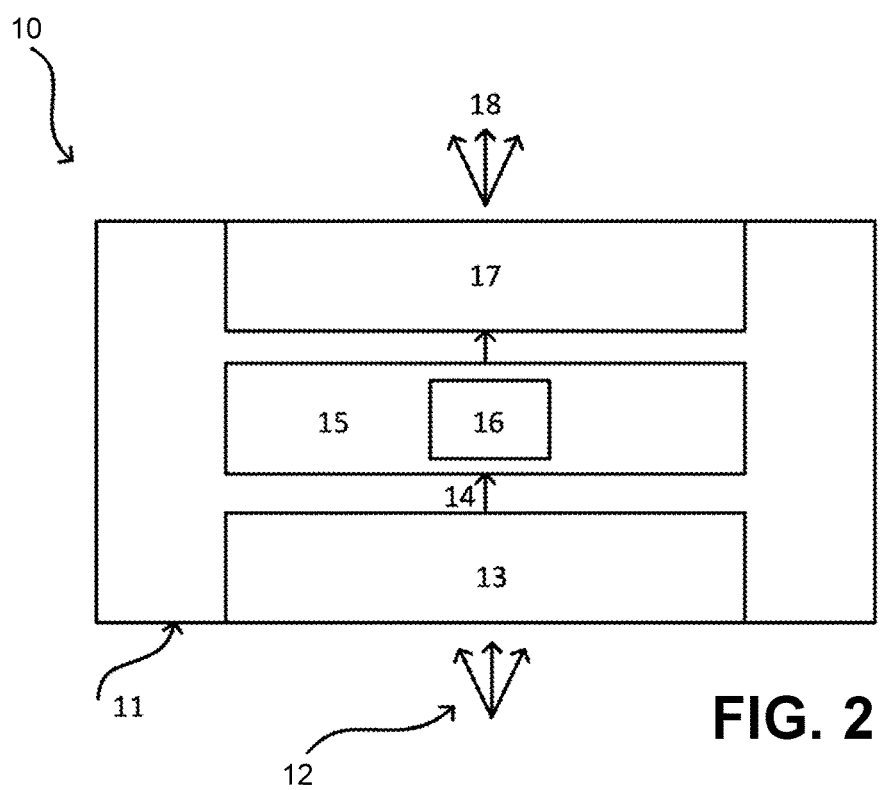
FIG. 2 shows a schematic diagram of an additional module according to the present disclosure.

FIG. 2 shows a schematic sketch of an additional module 10 according to the present disclosure. A first optical signal 12 arrives at a receiving unit 13 of the additional module, which can, for example, be a photodetector. The receiving unit 13, together with an electronics module unit 15 and a display/transmission unit 17, is arranged in a housing. The at least one first optical signal 12 is converted by means of the receiving unit 13 into at least one first electrical signal 14 and forwarded to the at least one arithmetic unit 16 of the electronics module unit 15. There, the at least one first electric signal is evaluated, and the at least one piece of field device information is extracted and transmitted to the display/transmission unit. Depending upon the design, the display/transmission unit 17 can display the at least one piece of field device information, or transmit said information to an external unit 18.

Figure 3:
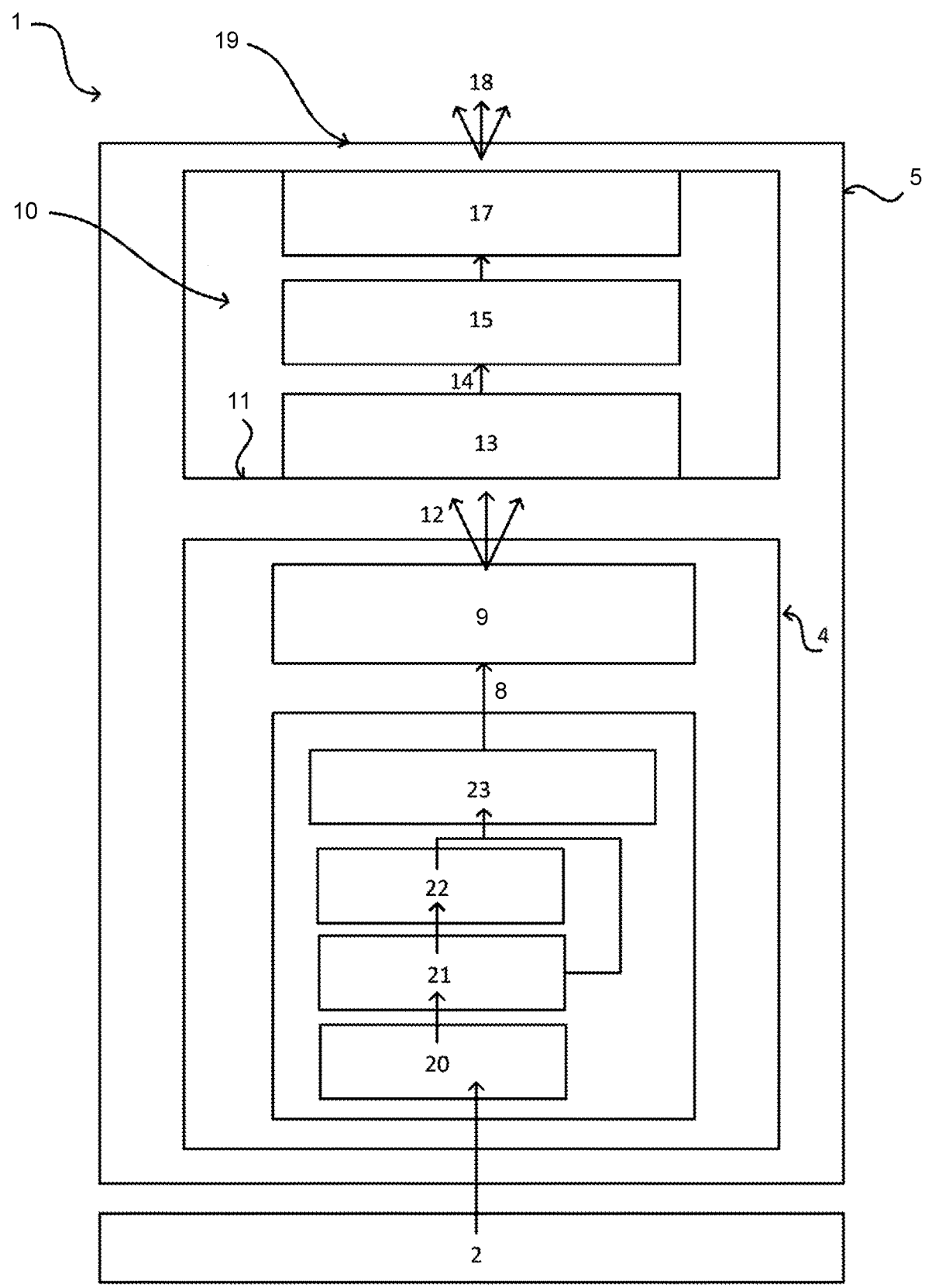
FIG. 3 shows the arrangement of an additional module according to the present disclosure within a field device.

In an embodiment, the additional module 10 can be integrated into existing field device electronics 4, as shown in FIG. 3. Of course, the housing dimensions of the field device housing 5 then must be correspondingly adapted. It is, moreover, useful to design the cover 19 of the field device housing 5 to be transparent, i.e., in particular, containing a window. This window should be designed so that it is transparent to the wavelength of the at least one first optical signal 12 and possibly also to the wavelength of the at least one second optical signal 35 (see FIG. 6).

The sensor unit 2 of the field device 1 transmits a signal representing a measured value to the field device electronics 4 that perform a measured value evaluation 20 in a first step. Frequently, the determined measured value is evaluated using a unit for measured value evaluation 21, in order to determine, for example, how to undertake a regulation of the transmission signal by means of a switching unit for controlling the measuring device 23. Moreover, the field device electronics 4 communicate with an optical display unit 9 in order to display at least one piece of field device information by means of at least one optical display element. According to the present disclosure, either just that information is displayed which is otherwise displayed by the optical display element 9, or at least one additional piece of field device information is applied to the optical display element, which information is contained in the at least one first optical signal 12 of the optical display element 9 of the field device. The at least one first optical signal 12 is then received by the additional module 10 arranged upstream from the field device electronics 4, but within the field device housing 5, and processed further as explained in FIG. 2.

Figure 4:
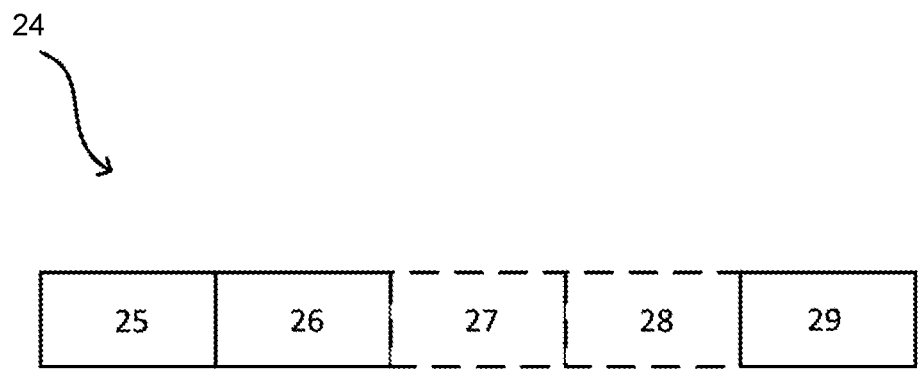
FIG. 4 shows a typical transmission signal that is evaluated by means of a suitable electronics module unit.

FIG. 4 depicts, for example, a transmission frame for transmitting the at least one piece of device information 24. An identifier 26 follows a start bit 25, and, optionally, (box framed by a dashed line) the information of a command and the length. Then follows the transmission of the respective data 29, i.e., the corresponding field device information.

Figure 5:
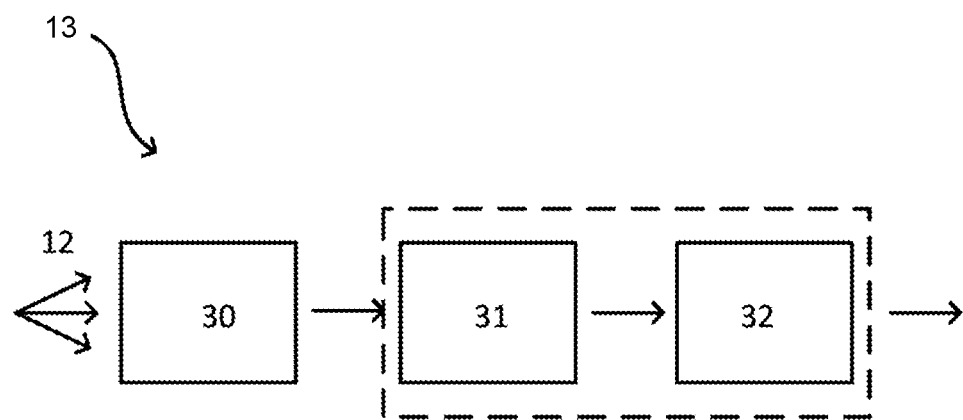
FIG. 5 shows a block diagram of a receiving unit in the form of a photodetector.

The receiving unit 13 of the additional module 10 can, for example, include a photodetector 30. FIG. 5 depicts, for example, a block diagram of a possible receiving unit 13 in the form of a photodetector. In selecting the photodetector, consideration should be given to the luminous intensity of the optical display element 9a of the field device, such as an LED, the speed of communication between the additional module 10 and field device 1, as well as the distance between the receiving unit 12 and the optical display element 9a. The at least one first optical signal 12 arrives at a photodetector 30. Before it is forwarded to the electronics module unit 15, the at least one optical signal 12 detected, which is converted into at least one first electrical signal by means of the photodetector 30, is amplified by an amplifier 31, and also passes through a comparator 32.

Phototransistors or photodiodes which are sensitive to the wavelength of the at least one first optical signal are, for example, suitable as photodetectors 30. The amplifier 31 and comparator 32 can either be individually integrated and harmonized, or combined variants in which both components are already optimized for each other are also conceivable, as indicated by the box framed by a dashed line.

Figure 6:
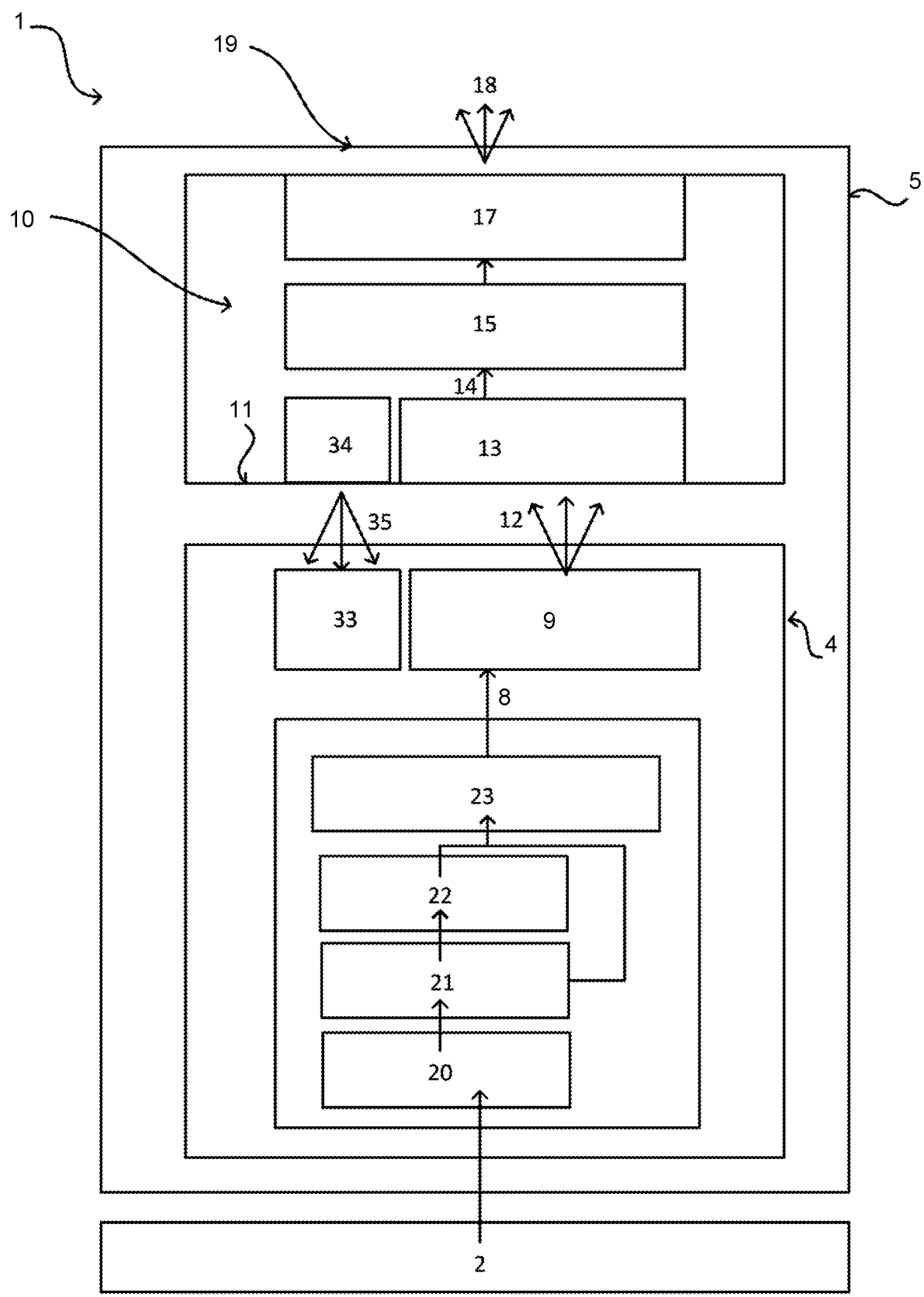
FIG. 6 shows the arrangement of an additional module according to the present disclosure within a field device which is suitable for bi-directional communication.

Another embodiment of the present disclosure is the subject matter of FIG. 6. As in FIG. 3, an arrangement is shown of an additional module 10 according to the present disclosure within a field device 1. In contrast to the embodiment according to FIG. 3, the version shown in FIG. 6 is, however, suitable for bi-directional communication between the field device 1 and the additional module 10. Reference signs that have already been addressed will not be considered below. The differences consist, on the one hand, in the integration of an optical field device receiving unit 33. This can, for example, contain a photoreceiver just like the receiving unit 13 of the additional module 10. Furthermore, the additional module 10 must have an optical transmission unit 34 in this case, which contains at least one second optical signal 35 containing at least one piece of information such as a set of field device parameters or the like. Accordingly, the field device 1 can also be parameterized using the additional module 10. Of course, in the event of bi-directional communication wherein the central control unit 6 of the field device 1 is for this purpose designed, a protocol in particular, an IrDA or UART-encoded protocol is to be executed, in order to extract the at least one piece of information from the at least one second optical signal 35 of the field device 1.

What is claimed is:

1. An additional module for an automation field device, comprising:
  a module housing including a plug-in connection unit by which the additional module is releasably attached within the field device;
  an optical receiving unit including a photodetector, wherein the optical receiving unit is disposed at least partially within the module housing and wherein the photodetector is embodied to wirelessly receive a first optical signal emitted by the field device and to convert the first optical signal into a first electrical signal;
  a display and transmission unit including an LED and a further including a Bluetooth interface; and
  an electronics module unit electrically connected to the optical receiving unit and to the display and transmission unit,
  wherein the electronics module unit is configured to extract at least one piece of field device information from the first electrical signal and to transmit the at least one piece of field device information to the display and transmission unit, and wherein the display and transmission unit is embodied to display the at least one piece of field device information via the LED and to transmit the at least one piece of field device information via Bluetooth to an external unit.

2. The additional module of claim 1, wherein the electronics module unit includes at least one arithmetic unit.

3. The additional module of claim 2, wherein the at least one arithmetic unit is configured to execute a communication protocol to extract the at least one piece of field device information from the first electrical signal.

4. The additional module of claim 3, wherein the communication protocol is an IrDA or a UART encoded protocol.

5. The additional module of claim 1, wherein the additional module is embodied for bi-directional communication with the field device.

6. The additional module of claim 1, further comprising an optical transmission unit embodied to transmit a second optical signal to the field device.

7. An automation field device, comprising:
a field device housing;
at least one sensor module;
a field device electronics;
an optical display unit; and
an additional module, the additional module comprising:
  a module housing,
  an optical receiving unit including a photodetector, wherein the optical receiving unit is disposed at least partially within the module housing and wherein the photodetector is embodied to wirelessly receive a first optical signal emitted by the automation field device and to convert the first optical signal into a first electrical signal,
  a display and transmission unit including an LED and a further including a Bluetooth interface, and
  an electronics module unit electrically connected to the optical receiving unit and to the display and transmission unit,
  wherein the electronics module unit is configured to extract at least one piece of field device information from the first electrical signal and to transmit the at least one piece of field device information to the display and transmission unit, and
  wherein the display and transmission unit is embodied to display the at least one piece of field device information via the LED and to transmit the at least one piece of field device information via Bluetooth to at least one external unit,
  wherein the field device electronics are embodied to apply a second electrical signal to the optical display unit, the second electrical signal containing the at least one piece of field device information,
  wherein the optical display unit is embodied to transmit a first optical signal containing the at least one piece of field device information, and
  wherein the additional module is releasably attached within the field device housing proximate to the optical display unit and is arranged such that the optical receiving unit faces the optical display unit.

8. The automation field device of claim 7, wherein the optical display unit is further embodied to modulate the at least one piece of field device information onto the first optical signal.

9. The automation field device of claim 7, wherein the field device housing includes a window, and wherein the display and transmission unit is arranged facing the window.

10. The automation field device of claim 7, wherein the field device housing enables the use of the field device in a potentially explosive environment.

11. The automation field device of claim 7, wherein the optical display unit includes at least one light-emitting optical display unit configured to display at least one light signal.

12. The automation field device of claim 11, wherein the optical display unit is configured to display at least one of the following: a switching state; an operating state; a fault; and a malfunction of the field device, by the at least one light signal.

13. The automation field device of claim 11 wherein the at least one light-emitting optical display unit is configured to display at least one colored light signal.

14. The automation field device of claim 7, the additional module further comprising an optical transmission unit embodied to transmit a second optical signal to the field device, the field device further comprising an optical receiving unit embodied to receive the second optical signal from the additional module.

* * * * *